United States Patent
Zhu (10) Patent No.: US 9,377,007 B2
(45) Date of Patent: Jun. 28, 2016

(54) SYSTEM, DEVICE, AND METHOD FOR ADJUSTING WIND TURBINE COMPONENT WORKLOAD

(75) Inventor: Wei Zhu, Shanghai (CN)

(73) Assignee: General Electric Company, Schenectady, NY (US)

( * ) Notice: Subject to any disclaimer, the term of this patent is extended or adjusted under 35 U.S.C. 154(b) by 387 days.

(21) Appl. No.: 13/976,674

(22) PCT Filed: Dec. 30, 2010

(86) PCT No.: PCT/CN2010/002219
§ 371 (c)(1),
(2), (4) Date: Jun. 27, 2013

(87) PCT Pub. No.: WO2012/088640
PCT Pub. Date: Jul. 5, 2012

(65) Prior Publication Data
US 2013/0272878 A1    Oct. 17, 2013

(51) Int. Cl.
*F03D 7/00* (2006.01)
*F03D 7/02* (2006.01)
(Continued)

(52) U.S. Cl.
CPC ............... *F03D 7/00* (2013.01); *F03D 7/0204* (2013.01); *F03D 7/0292* (2013.01); *F03D 7/043* (2013.01); *H02P 9/04* (2013.01); *F05B 2270/321* (2013.01);
(Continued)

(58) Field of Classification Search
CPC ....... F03D 7/00; F03D 7/0292; F03D 7/0204; F03D 7/043; H02P 9/04; F05B 2270/329; F05B 2270/321; F05B 2270/332; Y02E 10/723

USPC .......................................... 700/276; 416/1, 61
See application file for complete search history.

(56) References Cited

U.S. PATENT DOCUMENTS

| | | |
|---|---|---|
| 6,840,734 B2 | 1/2005 | Hansen |
| 7,351,033 B2 | 4/2008 | McNerney |

(Continued)

FOREIGN PATENT DOCUMENTS

CA    2716155 A1    5/2010

OTHER PUBLICATIONS

European Search Report and Written Opinion issued in connection with corresponding EP Application No. 10861524.6-1607 dated Jun. 12, 2014.

(Continued)

*Primary Examiner* — Kenneth M Lo
*Assistant Examiner* — Jason Lin
(74) *Attorney, Agent, or Firm* — James McGinness, Esq.; Armstrong Teasdale LLP (57) ABSTRACT

A system, a device and a method for controlling an operation of a wind turbine (100) based on a wind turbine component workload. The system includes a control device (120) that is configured to actuate a wind turbine component (130). The system also includes a wind turbine controller (205) that is coupled in communication with the control device (120) and configured to determine a workload associated with the wind turbine component (130) based at least in part on one or more actuations of the wind turbine component (130) by the control device (120) within a time period. The wind turbine controller (205) is also configured to calculate an operating threshold value based at least in part on the calculated workload and to operate the wind turbine component (130) by the control device (120) based on the calculated operating threshold value.

20 Claims, 4 Drawing Sheets

(51) Int. Cl.
*H02P 9/04* (2006.01)
*F03D 7/04* (2006.01)

(52) U.S. Cl.
CPC ..... *F05B 2270/329* (2013.01); *F05B 2270/332* (2013.01); *Y02E 10/723* (2013.01)

(56) References Cited

U.S. PATENT DOCUMENTS

| | | | |
|---|---|---|---|
| 2007/0247964 A1* | 10/2007 | Ross | B28C 5/4206 366/61 |
| 2008/0203246 A1* | 8/2008 | Ingram | F03D 1/001 248/74.1 |
| 2009/0068013 A1* | 3/2009 | Birkemose | F03D 7/0204 416/31 |
| 2009/0243295 A1* | 10/2009 | Kammer | F03D 7/0224 290/44 |
| 2010/0140938 A1* | 6/2010 | Cook | F03D 7/043 290/44 |
| 2010/0158687 A1 | 6/2010 | Dawson et al. | |
| 2011/0127772 A1* | 6/2011 | Fukami | F03D 7/0204 290/44 |
| 2011/0142593 A1* | 6/2011 | Hoffmann | F03D 11/0091 415/1 |
| 2011/0142594 A1* | 6/2011 | Dinjus | F03D 7/0224 415/4.3 |
| 2011/0304295 A1* | 12/2011 | McNally | H01M 10/46 320/101 |
| 2012/0010852 A1* | 1/2012 | Winkelmann | F03D 11/0091 702/179 |
| 2012/0061962 A1* | 3/2012 | Nagasaki | F03D 7/0224 290/44 |

OTHER PUBLICATIONS

International Search Report, Chinese Patent Application No. PCT/CN2010/002219, dated Oct. 11, 2011, pp. 13.

* cited by examiner

SYSTEM, DEVICE, AND METHOD FOR ADJUSTING WIND TURBINE COMPONENT WORKLOAD

CROSS REFERENCE TO RELATED APPLICATIONS

This application is a National Phase of Chinese PCT Patent Application No. PCT/CN2010/002219, filed Dec. 30, 2010, which is hereby incorporated by reference in its entirety.

BACKGROUND OF THE INVENTION

The subject matter described herein relates generally to operating a wind turbine and, more particularly, to operating a wind turbine component based on a workload associated with the component.

Wind turbines utilize wind energy to generate or produce electrical power. Known wind turbines include a control system for operating a wind turbine in a safe and efficient manner. Control parameters, such as operating threshold values, are used to define the behavior of the wind turbine. For example, a controller of a wind turbine may be programmed to ensure the rotational speed of the rotor remains below a maximum rotor speed threshold value, such as by adjusting a rotor blade pitch.

Such adjustments may require work by wind turbine components, subjecting these components to eventual physical degradation. Further, some wind turbine components may be used with greater frequency than the frequency with which other components are used, resulting in relatively high wear rates for the frequently used components.

BRIEF DESCRIPTION OF THE INVENTION

In one aspect, a system for controlling an operation of a wind turbine is provided. The system includes a control device that is configured to actuate a wind turbine component. The system also includes a wind turbine controller that is coupled in communication with the control device and configured to determine a workload associated with the wind turbine component based at least in part on one or more actuations of the wind turbine component by the control device within a time period. The wind turbine controller is also configured to calculate an operating threshold value based at least in part on the determined workload and to operate the wind turbine component by the control device based on the calculated operating threshold value.

In another aspect, a device for controlling an operation of a wind turbine is provided. The device includes a wind turbine control interface, a memory, and a processor that is coupled to the wind turbine control interface and the memory. The wind turbine control interface is configured to actuate the wind turbine component by a control device. The memory is configured to store one or more actuations of the wind turbine component by the wind turbine control interface. The processor is programmed to determine a workload associated with the wind turbine component based at least in part on the actuations of the wind turbine component within a time period. The processor is also programmed to calculate an operating threshold value based at least in part on the determined workload and to actuate the wind turbine component by the wind turbine control interface based at least in part on the calculated operating threshold value.

In yet another aspect, a method for controlling an operation of a wind turbine is provided. The method includes operating a wind turbine component at a first time based on a first operating threshold value. The first operating threshold value is based at least in part on one or more actuations of the wind turbine component within a first time period. A workload is determined by the computing device based at least in part on one or more actuations of the wind turbine component within a second time period subsequent to the first time period. A second operating threshold value is calculated by the computing device based at least in part on the workload. At a second time subsequent to the first time, the wind turbine component is operated based on the second operating threshold value.

DETAILED DESCRIPTION OF THE INVENTION

The embodiments described herein facilitate operating a wind turbine based on one or more workloads (e.g., duty cycles) associated with a wind turbine component. In exemplary embodiments, as a first component is used to achieve a desired result (e.g., reducing rotor speed or reducing torque on a driveshaft), the determined workload of the first component increases, and an operating threshold value associated with the first component may be adjusted based on this increased workload. A second component may be associated with an operating threshold value that is greater than the original operating threshold value associated with the first component but less than the adjusted operating threshold value. The second component may therefore be used in lieu of the first component to achieve the same desired result. Accordingly, embodiments provided herein facilitate balancing workloads between wind turbine components.

As described herein, a wind turbine may be controlled based on one or more operating conditions. Operating conditions include, without limitation, mechanical conditions (e.g., a rotor speed and/or a power output) and meteorological conditions. A meteorological condition may include, for example, an ambient air temperature, an ambient air density, a humidity level, an air pressure, a wind speed, and/or a wind direction. Some operating conditions may indicate and/or represent, directly or indirectly, a structural load (e.g., torque) on a wind turbine. For example, a structural load may be indirectly represented by a wind speed, a rotor speed, and/or a power output, though the use of any operating condition representing an environmental element (e.g., a relative wind direction) and/or a structural load is contemplated.

Operating conditions may be encoded in or otherwise conveyed by electronic signals. In some embodiments, a sensor transmits a signal that conveys an operating condition. A device receiving the signal from the sensor may be configured to derive or extract the operating condition from the signal.

In some embodiments, a control parameter, such as an operating threshold value, is used to control a wind turbine. An operating threshold value may include, without limitation, a maximum operating wind speed, a maximum rotor speed, and/or a maximum driveshaft torque. Operating threshold values may be associated with wind turbine components, such as a blade pitch mechanism and/or a rotor brake. For example, if a maximum rotor speed is associated with a blade pitch mechanism, the current rotor speed may be continuously or periodically monitored. If the current rotor speed exceeds the maximum rotor speed, a control device may actuate the blade pitch mechanism to reduce the rotor speed.

An exemplary technical effect of the methods, system, and apparatus described herein includes at least one of: (a) determining a workload associated with a wind turbine component based at least in part on one or more actuations of the wind turbine component within a time period; (b) calculating an operating threshold value based at least in part on the determined workload; and (c) operating the wind turbine component based on the calculated operating threshold value.

Figure 1:
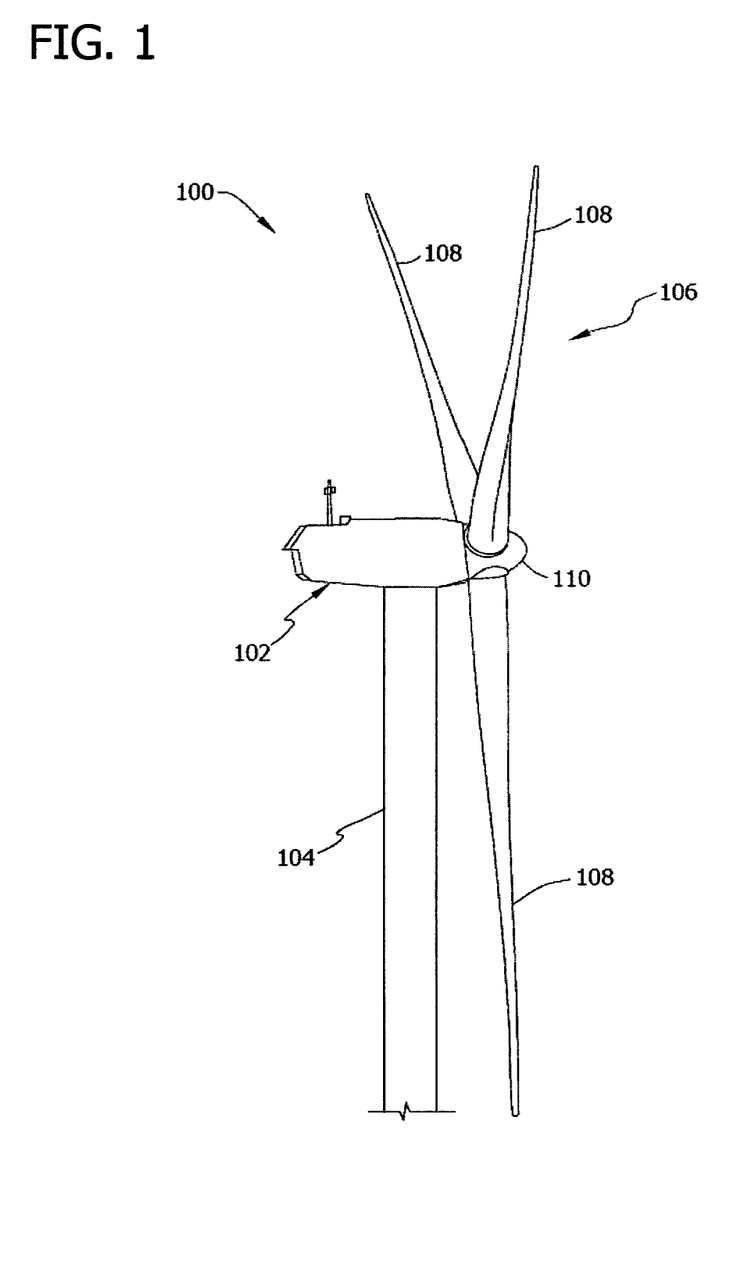
FIG. 1 is a perspective view of an exemplary wind turbine.

FIG. 1 is a perspective view of an exemplary wind turbine 100. Wind turbine 100 includes a nacelle 102 that houses a generator (not shown in FIG. 1). Nacelle 102 is mounted on a tower 104 (only a portion of tower 104 is shown in FIG. 1). Tower 104 may have any suitable height that facilitates operation of wind turbine 100 as described herein. In the exemplary embodiment, wind turbine 100 also includes a rotor 106 that includes three rotor blades 108 coupled to a rotating hub 110. Alternatively, wind turbine 100 may include any number of rotor blades 108 that enables operation of wind turbine 100 as described herein. In the exemplary embodiment, wind turbine 100 includes a gearbox (not shown) that is rotatably coupled to rotor 106 and to the generator. Wind turbine 100 may include one or more control devices 120, sensors 125, and/or wind turbine components 130 (shown in FIG. 2).

Figure 2:
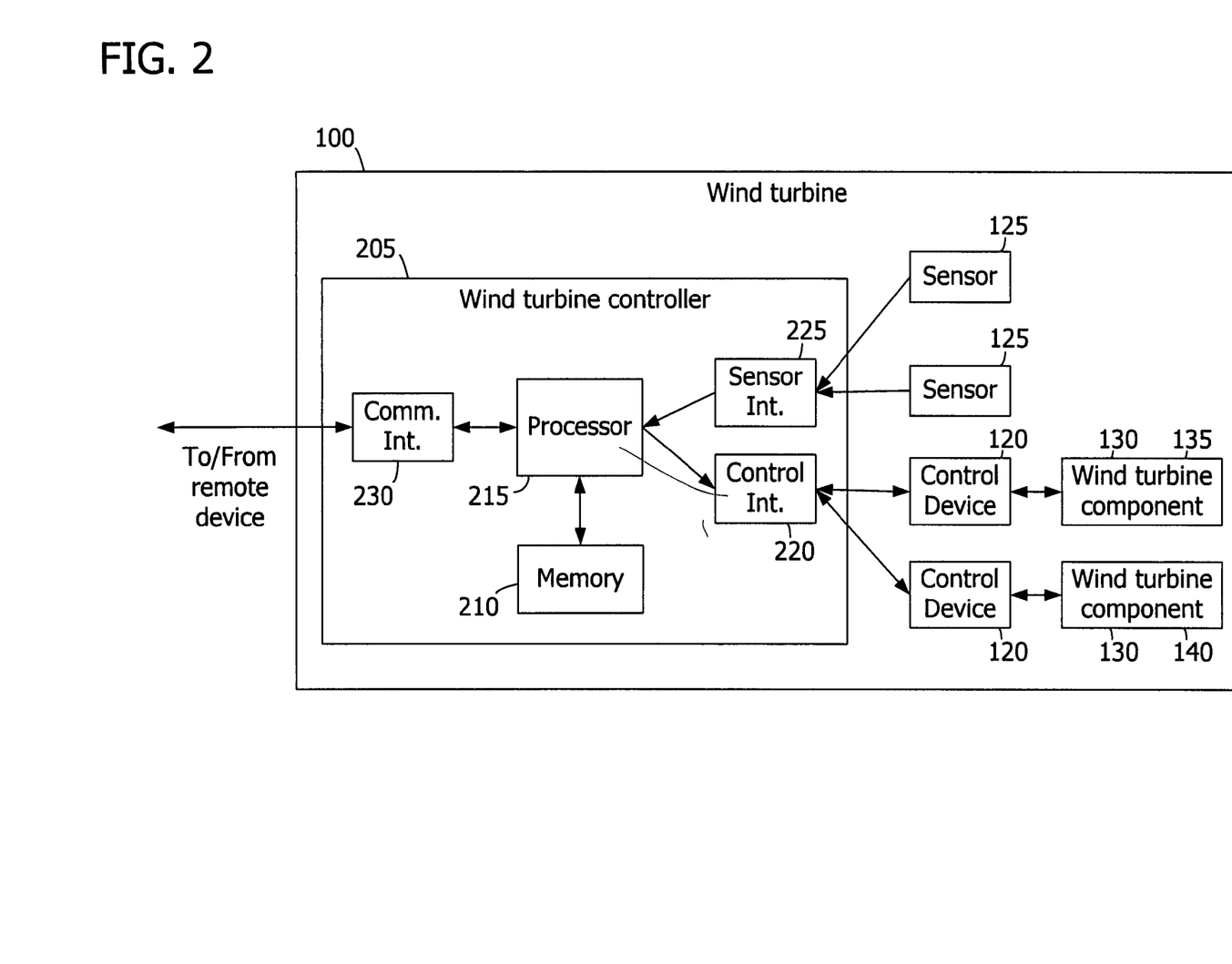
FIG. 2 is a block diagram showing an exemplary computing device.

FIG. 2 is a block diagram showing an exemplary computing device 205 for controlling operation of wind turbine 100. Computing device 205 may also be referred to as a wind turbine controller. Wind turbine controller 205 is positioned within wind turbine 100. For example, wind turbine controller 205 may be positioned on or within nacelle 102 or on or within tower 104.

Wind turbine controller 205 includes a memory 210 configured to store computer-executable instructions, operating threshold values, and/or one or more operating conditions, such as meteorological conditions. Meteorological conditions may include, without limitation, an ambient air temperature, an ambient air density, a humidity level, an air pressure, a wind speed, and/or a wind direction. Memory 210 may be further configured to store functions for use in calculating operating threshold values based on workloads associated with one or more wind turbine components 130, optionally in the form of one or more computer-executable instructions.

Wind turbine controller 205 also includes a processor 215 coupled to memory 210 and programmed to execute computer-executable instructions. For example, one or more operations described herein may be encoded as computer-executable instructions, which processor 215 is programmed to execute in order to perform such operations.

Wind turbine controller 205 further includes a wind turbine control interface 220 that is configured to control one or more wind turbine components 130. In an exemplary embodiment, wind turbine 100 includes a first wind turbine component 135 and a second wind turbine component 140. In some embodiments, wind turbine control interface 220 is configured to be operatively coupled to one or more control devices 120.

Control devices 120 actuate wind turbine components 130 including, without limitation, a yaw mechanism, a blade pitch mechanism, a power converter, an insulated-gate bipolar transistor (IGBT), a rotor brake, a heater, a chiller, a motor, a solenoid, and/or a servomechanism. For example, control device 120 may include a switch, a contactor, a relay, a power supply, and/or any other device controlling actuation of a wind turbine component 130. In some embodiments, control device 120 actuates a wind turbine component 130 to adjust a physical configuration of wind turbine 100, such as an angle or pitch of rotor blades 108 and/or an orientation of nacelle 102 or rotor 106 with respect to tower 104 (shown in FIG. 1). In exemplary embodiments, wind turbine controller 205 monitors actuation of wind turbine components 130 by control devices 120. In some embodiments, a control device 120 is integrated with a wind turbine component 130. For example, a yaw mechanism may include drive components (e.g., a motor and gears) and one or more control devices 120 for operating the drive components.

In some embodiments, wind turbine 100 includes one or more sensors 125. Sensors 125 sense or detect one or more operating conditions. For example, sensor 125 may be an accelerometer, a vibration sensor (e.g., indicating mechanical vibration of one or more wind turbine components 130), a power output sensor, a blade pitch sensor, a rotor speed sensor, a gear ratio sensor, a torque sensor, a turbine temperature sensor, a gearbox temperature sensor, a voltage sensor, a current sensor, and/or a meteorological sensor. Meteorological sensors include, without limitation, an ambient air temperature sensor, a wind speed and/or wind direction sensor (e.g., an anemometer), an ambient air density sensor, an atmospheric pressure sensor, a humidity sensor, and/or any sensor suitable for providing a signal indicating a meteorological condition.

Each sensor 125 is located with respect to wind turbine 100 according to its function. For example, referring also to FIG. 1, an air temperature sensor may be positioned on an outside surface of nacelle 102 or tower 104, such that the air temperature sensor is exposed to ambient air surrounding wind turbine 100. Further, a control device 120 may include one or more sensors 125. For example, a control device 120 coupled to a blade pitch mechanism may indicate a current pitch of one or more rotor blades 108. Similarly, a control device 120 coupled to a yaw mechanism may indicate a current orientation of nacelle 102 or rotor 106 relative to tower 104. Each sensor 125 generates and transmits a signal corresponding to the one or more detected conditions. Moreover, each sensor 125 may transmit a signal continuously, periodically, or only once, for example, though other signal timings are also contemplated.

In one embodiment, wind turbine controller 205 receives one or more signals from sensor 125 by a sensor interface 225, which is configured to be coupled in communication with sensor 125. Wind turbine controller 205 processes the signal(s) by processor 215 to determine one or more operating conditions, including, without limitation, meteorological conditions. In some embodiments, processor 215 is programmed (e.g., with executable instructions in memory 210) to sample a signal produced by sensor 125. For example, processor 215 may receive a continuous signal from sensor 125 and, in response, produce an operating condition value based on the continuous signal periodically (e.g., once every five seconds). In some embodiments, processor 215 normalizes a signal received from sensor 125. For example, a temperature sensor may produce an analog signal with a parameter (e.g., voltage) that is directly proportional to a measured temperature. Processor 215 may be programmed to convert the analog signal to a temperature value.

Processor 215 may be programmed to derive an operating condition based on signals received from multiple sensors 125. For example, wind turbine 100 may include multiple air temperature sensors, and processor 215 may calculate an average air temperature based on temperature values from each air temperature sensor. In another example, processor 215 may determine a relative wind direction (also referred to as a wind direction delta) based on an absolute wind direction (e.g., expressed with respect to a cardinal direction) indicated by an anemometer and a current nacelle orientation indicated by a yaw mechanism. In some embodiments, controller 205 stores one or more signals and/or operating conditions in memory 210.

In an exemplary embodiment, processor 215 is programmed to calculate one or more operating threshold values that are each associated with a wind turbine component 130, as described in more detail below with reference to FIG. 3. Further, processor 215 and/or wind turbine control interface 220 may control an operation of wind turbine 100 based on the calculated operating threshold values and operating conditions indicated by sensors 125, as described in more detail below with reference to FIG. 4.

In some embodiments, wind turbine controller 205 includes a communication interface 230. Communication interface 230 is configured to be coupled in communication with one or more remote devices, such as another wind turbine controller 205 or other computing device. Communication interface 230 may be configured to transmit an operating condition, a workload, and/or an operating threshold value to a remote device. In addition, or alternatively, communication interface 230 may be configured to receive an operating condition (e.g., a wind direction and/or an ambient air temperature) and/or a control parameter (e.g., an operating threshold value) from a remote device and control an operation of wind turbine 100 based at least in part on the received operating condition and/or control parameter.

Various connections are available between wind turbine control interface 220 and control devices 120 and between sensor interface 225 and sensors 125. Such connections may include, without limitation, an electrical conductor, a low-level serial data connection, such as Recommended Standard (RS) 232 or RS-485, a high-level serial data connection, such as Universal Serial Bus (USB), a parallel data connection, such as IEEE 1284 or IEEE 488, a short-range wireless communication channel (e.g., a personal area network), and/or a private (e.g., inaccessible outside wind turbine 100) network connection, whether wired or wireless.

Figure 3:
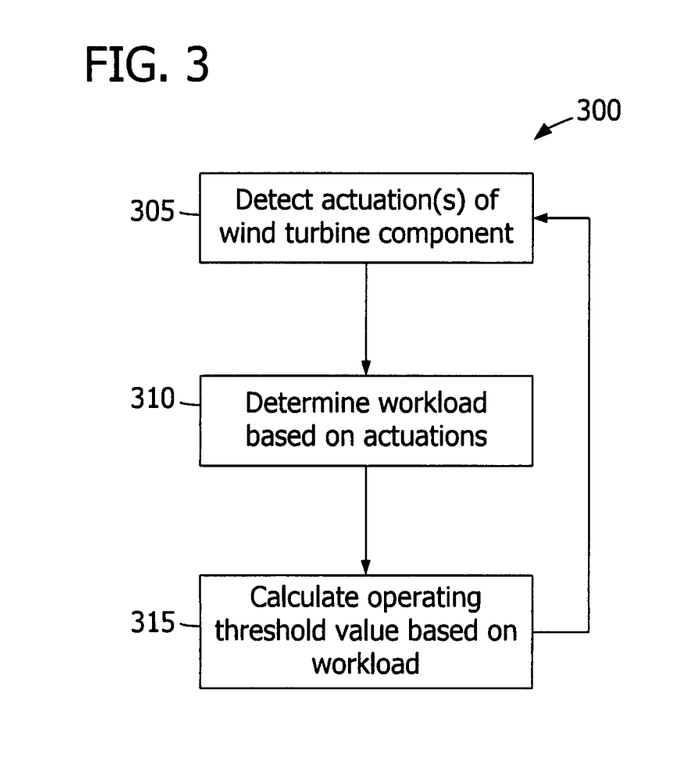
FIG. 3 is a flowchart of an exemplary method for calculating an operating threshold value associated with the wind turbine component shown in FIG. 2.
Figure 4:
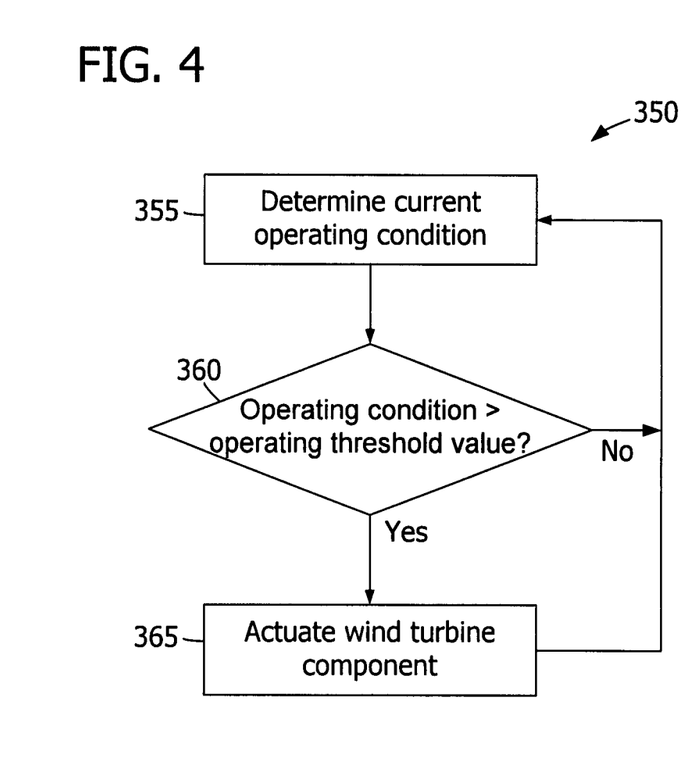
FIG. 4 is a flowchart of an exemplary method for controlling the wind turbine shown in FIG. 1 based on a calculated operating threshold value.

FIG. 3 is a flowchart of an exemplary method 300 for calculating an operating threshold value associated with a wind turbine component 130. FIG. 4 is a flowchart of an exemplary method 350 for controlling a wind turbine, such as wind turbine 100 (shown in FIG. 1), based on a calculated operating threshold value. Referring to FIGS. 2-4, one or more operations of methods 300 and 350 may be performed by a computing device, such as wind turbine controller 205.

Referring to FIGS. 2 and 3, method 300 includes detecting 305 one or more actuations of a wind turbine component 130. For example, actuations may be detected 305 by monitoring control devices 120 by wind turbine control interface 220 and/or by recording actuations of wind turbine components 130 initiated by wind turbine control interface 220. Actuations of wind turbine components 130 may be stored in memory 210. In some embodiments, detecting 305 an actuation of the wind turbine component 130 includes detecting 305 a level of actuation, such as the elapsed time of the actuation, the intensity of the actuation, and/or the displacement (e.g., linear and/or angular) of wind turbine component 130 achieved by the actuation. The intensity of the actuation may include, without limitation, the velocity and/or acceleration of wind turbine component 130, the amount of force applied to wind turbine component 130, and/or the energy used by the actuation. For example, the actuation of a yaw mechanism may be associated with an angular displacement (e.g., ten degrees) representing the rotation of nacelle 102 relative to tower 104. Similarly, the actuation of a heater may be associated with the energy (e.g., two kilowatt hours) supplied to the heater during the actuation.

A workload is determined (e.g., calculated) 310 based on the detected actuations. In exemplary embodiments, the workload is based on actuations of wind turbine component 130 within a time period (e.g., the previous 48 hours, the previous 24 hours, or the previous 12 hours). For example, the workload may be positively correlated with (e.g., equal to or proportional to) the quantity of actuations of wind turbine component 130 within the time period. In addition, or alternatively, the workload may be based on an aggregate level of actuation (e.g., an elapsed time, a displacement, or an intensity) of wind turbine component 130 within the time period. For example, the level of actuation associated with each actuation in the time period may be summed to calculate the aggregate level of actuation. The workload may be positively correlated with (e.g., equal to or proportional to) the aggregate level of actuation.

In some embodiments, the workload is determined 310 based on actuations of wind turbine component 130 and a predetermined actuation limit. The actuation limit may be based on design characteristics of wind turbine component 130, expected operating conditions of wind turbine 100 (e.g., ambient air temperature), and/or any other factors affecting stress or wear associated with wind turbine component 130. In such embodiments, actuations of wind turbine component 130 may affect the workload only when the detected actuations exceed the actuation limit.

Equation 1 is an exemplary function for determining 310 the workload of a wind turbine component 130, such as a yaw mechanism.

$$\Phi = \max(0, \Phi_1 - \Phi_0) \qquad (\text{Eq. 1})$$

In Equation 1, the workload is represented by a workload delta ($\Phi$), which is based on the quantity of actuations in the previous 24 hours ($\Phi_1$). A predetermined actuation limit ($\Phi_0$) is subtracted from $\Phi_1$. When $\Phi_1$ exceeds $\Phi_0$, $\Phi$ is equal to the difference between the two values. Otherwise, $\Phi$ is zero.

An operating threshold value associated with wind turbine component 130 is calculated 315 based at least in part on the workload. Equation 2 is an exemplary function for calculating an operating condition delta (wind direction delta, $\theta_1$) based on the workload delta ($\Phi$) determined using Equation 1.

$$\theta_1 = 5 \cdot \frac{1 - e^{-\Phi}}{1 + e^{-\Phi}} \qquad (\text{Eq. 2})$$

The operating condition delta may be used directly as an operating threshold value or may be combined with another value, such as a default threshold value, to determine the operating threshold value. Equation 3 is an exemplary function for calculating an operating threshold value ($\theta$) based on the operating condition delta ($\theta_1$) and a default threshold value ($\theta_0$).

$$\theta = \theta_0 + \theta_1 \qquad (\text{Eq. 3})$$

Figure 5:
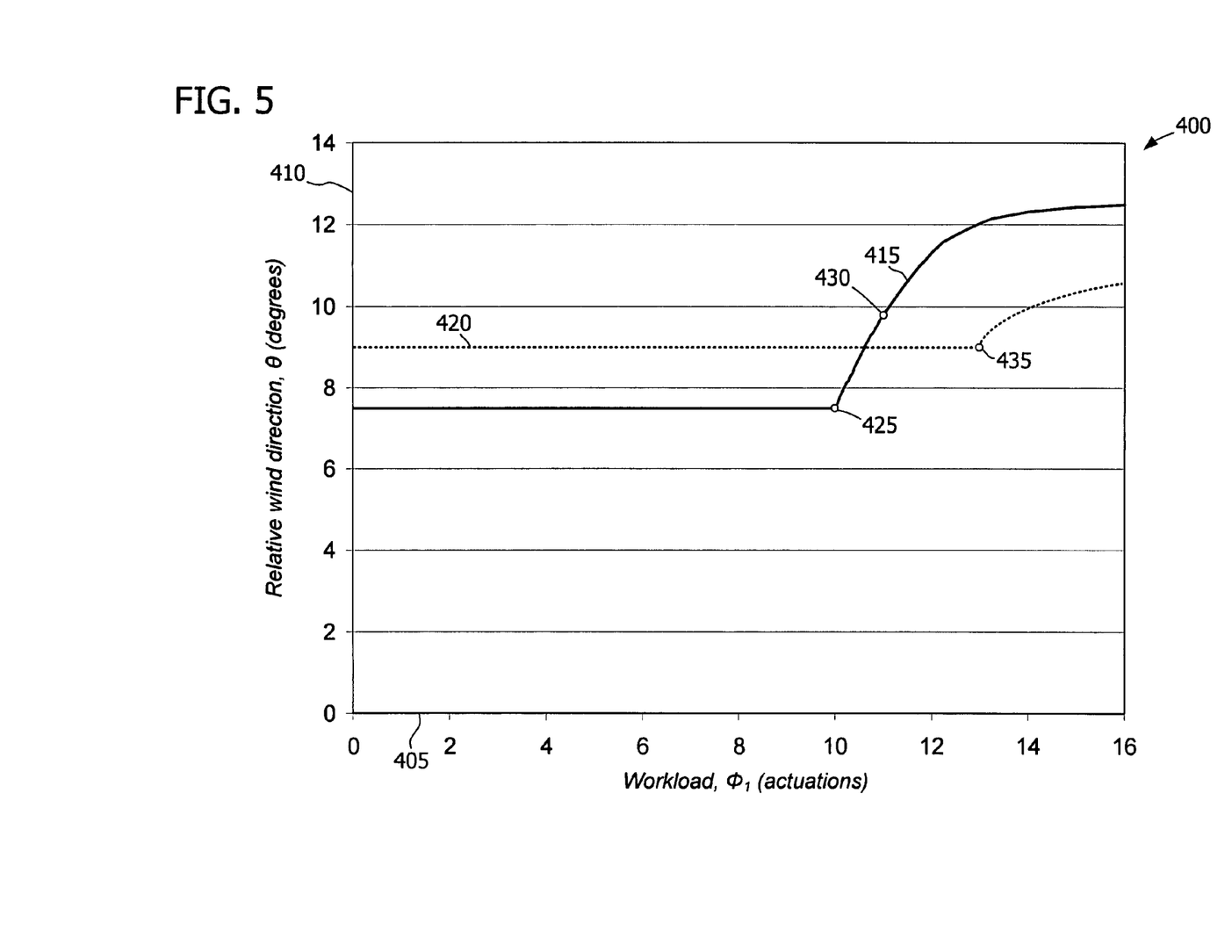
FIG. 5 is a graph plotting an exemplary function for determining an operating threshold value based on a workload.

FIG. 5 is a graph 400 plotting Equation 3, with an actuation limit ($\Phi_0$) of 10 actuations and a default threshold value ($\theta_0$)

of 7.5°. In graph 400, an x-axis 405 represents actuations ($\Phi_1$) of a wind turbine component 130 (shown in FIG. 2), and a y-axis 410 represents an operating threshold value ($\theta$). More specifically, x-axis 405 represents the quantity of actuations of wind turbine component 130 detected 305 (shown in FIG. 3), and y-axis 410 represents a maximum relative wind direction, above which the wind turbine component 130 is to be actuated (e.g., to orient rotor 106, shown in FIG. 1, toward the wind).

A first line 415 represents the value of $\theta$, as determined by Equation 3. As shown by first line 415, until the actuation limit ($\Phi_0$=10) is reached, the quantity of detected actuations ($\Phi_1$) has no effect on $\theta$, and $\theta$ is equal to the default threshold value ($\theta_0$=7.5). When $\Phi_1$ exceeds $\Phi_0$, $\theta$ is equal to the sum of $\theta_0$ and $\theta_1$, where $\theta_1$ is determined by Equation 2. Accordingly, first line 415 represents a continuous function relating an operating threshold value to a determined workload.

As shown by graph 400, the operating threshold value may be positively correlated with the workload, such that an increase in workload results in a corresponding increase in the operating threshold value. Similarly, as the determined workload decreases (e.g., as time elapses with no actuation of the yaw mechanism), the operating threshold value is also decreased. In such an embodiment, actuation of a wind turbine component 130 may be understood to provide feedback that is used in determining when to actuate the wind turbine component 130 again in the future.

Method 300 may be performed repeatedly (e.g., continually, periodically, and/or upon request) to determine 310 a first workload, a second workload, etc., and to calculate 315 a first operating threshold, a second operating threshold value, etc., in succession. Each time method 300 is executed, the workload and operating threshold value are based on the actuations of wind turbine component 130 within the relevant time period. As time progresses, new actuations appear within the time period, and old actuations eventually fall outside the time period and are disregarded. Accordingly, the operating threshold value associated with wind turbine component 130 is adjusted over time based on actuation of wind turbine component 130. Further, method 300 may be performed for any number of wind turbine components 130 in wind turbine 100, such that a plurality of wind turbine components 130 are associated with dynamically determined workloads and operating threshold values.

FIG. 4 is a flowchart of an exemplary method 350 for controlling a wind turbine, such as wind turbine 100 (shown in FIG. 1). In exemplary embodiments, method 350 may be performed concurrently with method 300 (shown in FIG. 3). In addition, or alternatively, method 300 may be incorporated into method 350, such that a current operating threshold value is available for method 350.

Method 350 includes determining 355 a current operating condition. Referring to FIGS. 2 and 4, in some embodiments, determining 355 the current operating condition includes receiving an operating condition, such as a meteorological condition (e.g., a wind speed and/or wind direction), from a sensor 125. A plurality of such operating conditions may be averaged over a period of time (e.g., thirty seconds, sixty seconds, or three minutes).

The current operating condition is compared 360 to an operating threshold value, such as an operating threshold value calculated 315 by method 300 (shown in FIG. 3). In some embodiments, multiple wind turbine components 130 are associated with operating threshold values corresponding to the operating condition. For example, both a blade pitch mechanism and a power converter may be associated with operating threshold values corresponding to driveshaft torque. The current operating condition (e.g., the current driveshaft torque) is compared 360 to each such operating threshold value.

When the current operating condition violates the operating threshold value, the wind turbine component 130 associated with the operating threshold value is actuated 365 by control interface 220 and/or a control device 120. In exemplary embodiments, an operating threshold value is expressed as a minimum value or a maximum value. An operating condition is considered to violate a minimum operating threshold value when the operating condition is less than the minimum operating threshold value. Conversely, an operating condition is considered to violate a maximum operating threshold value when the operating condition is greater than the maximum operating threshold value. For example, if the current driveshaft torque exceeds a maximum driveshaft torque associated with a blade pitch mechanism, the blade pitch mechanism may be actuated 365 to reduce the pitch of rotor blades 108 (shown in FIG. 1), such that driveshaft torque is reduced. Similarly, if the current driveshaft torque exceeds a maximum driveshaft torque associated with a power converter, the power converter may be actuated 365 to reduce driveshaft torque. For example, in a doubly fed induction generator (DFIG), the strength of the magnetic field in the generator may be reduced to reduce driveshaft torque.

Particular examples are described above with respect to operating threshold values that represent maximum acceptable values. In addition, or alternatively, operating threshold values associated with some wind turbine components 130 may represent minimum acceptable values. For example, a heater, such as a lubricant heater, may be associated with a minimum lubricant temperature. When the current lubricant temperature is less than the minimum lubricant temperature, the lubricant heater may be actuated 365 to raise the lubricant temperature.

In some embodiments, method 350 is executed with respect to a plurality of wind turbine components 130 and/or a plurality of operating threshold values. Referring to FIGS. 2-5, first line 415 represents an operating threshold value associated with first wind turbine component 135 (e.g., a yaw mechanism). Graph 400 includes a second line 420 representing an operating threshold value associated with second wind turbine component 140. As shown in FIG. 5, second line 420 represents a dynamically calculated operating threshold value. Alternatively, the operating threshold value associated with the second wind turbine component 140 may be static. A static operating threshold value may be represented by a horizontal line (not shown) in graph 400.

In such an embodiment, a current relative wind direction may be determined 355. If the current relative wind direction is greater than the maximum relative wind direction represented by first line 415, first wind turbine component 135 is actuated 365. If the current relative wind direction is greater than the maximum relative wind direction represented by second line 420, second wind turbine component 140 is actuated 365.

As illustrated by graph 400, the actuation 365 of wind turbine components 130 may be dependent on the workload associated with each wind turbine component 130. For example, when first wind turbine component 135 is associated with ten actuations, the operating threshold value associated with first wind turbine component is equal to 7.5°, as indicated by a first point 425. The lowest operating threshold value associated with second wind turbine component is 9°, which is greater than the operating threshold value of first wind turbine component 135 at first point 425. Accordingly, as a current operating condition (e.g., relative wind direction)

increases past 7.5°, first wind turbine component 135 is actuated 365, which may reduce the current operating condition below the operating threshold value of 7.5° at first point 425.

The actuation 365 of first wind turbine component 135 is detected 305 and affects the workload determined 310 for first wind turbine component 135. More specifically, first wind turbine component 135 is now associated with eleven actuations and an operating threshold value of approximately 9.8°, as indicated by a second point 430. If second wind turbine component 140 is associated with thirteen or fewer actuations, indicated by a third point 435, an operating threshold value of 9° is associated with second wind turbine component 140. This operating threshold value is less than the operating threshold value of first wind turbine component 135 at second point 430. Accordingly, as the current operating condition increases past 9° at a later time, second wind turbine component 140 is actuated. Basing actuations 365 of first wind turbine component 135 and second wind turbine component 140 on corresponding determined workloads facilitates balancing the workload between first wind turbine component 135 and second wind turbine component 140, such that neither is exposed to excessive stress and/or wear.

Embodiments described herein enable the operation of one or more wind turbine components based on a recent actuation history associated with each wind turbine component. Accordingly, the frequencies with which wind turbine components are actuated may be distributed relatively evenly, facilitating reducing the probability of excessive wear of any individual component.

The methods described herein may be encoded as executable instructions embodied in a computer readable medium, including a memory of a computing device such as a wind turbine controller. Such instructions, when executed by a processor, cause the processor to perform at least a portion of the methods described herein.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other apparatus and methods.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for controlling an operation of a wind turbine, the system comprising:
   a wind turbine control device configured to actuate a wind turbine component; and
   a wind turbine controller communicatively coupled with said wind turbine control device and configured to:
      determine a workload associated with the wind turbine component based at least in part on one or more actuations of the wind turbine component by said wind turbine control device within a time period;
      calculate an operating threshold value based at least in part on the determined workload, wherein the calculated operating threshold value and the determined workload have a relationship at least partially defined by the operating threshold proportional to $(1-e^{-workload})/(1+e^{-workload})$; and,
      operate the wind turbine component by said control device based on the calculated operating threshold value.

2. A system in accordance with claim 1, wherein said wind turbine controller determines the workload based at least in part on a quantity of actuations by said wind turbine control device.

3. A system in accordance with claim 1, wherein said wind turbine controller determines the workload based at least in part on an elapsed time of actuation by said wind turbine control device.

4. A system in accordance with claim 1, wherein the calculated operating threshold value is associated with an operating condition, said system further comprising a sensor configured to indicate the operating condition, wherein said wind turbine controller is configured to actuate the wind turbine component by said wind turbine control device when the operating condition violates the calculated operating threshold value.

5. A system in accordance with claim 4, wherein said wind turbine controller is configured to actuate the wind turbine component by said wind turbine control device when a meteorological condition indicated by said sensor violates the calculated operating threshold value.

6. A system in accordance with claim 4, wherein the calculated operating threshold value is a first operating threshold value based on a first workload, and said wind turbine controller is further configured to:
   determine a second workload based at least in part on the actuation of the wind turbine component by said wind turbine controller; and,
   calculate a second operating threshold value based at least in part on the second workload.

7. A system in accordance with claim 1, wherein said wind turbine control device is a first wind turbine control device configured to actuate a first wind turbine component, said first wind turbine control device associated with a first operating threshold value, said system further comprising a second wind turbine control device communicatively coupled with said wind turbine controller and configured to actuate a second wind turbine component, wherein said wind turbine controller is further configured to:
   determine a workload associated with the second wind turbine component based at least in part on one or more actuations of the second wind turbine component by said second wind turbine control device within a time period;

calculate a second operating threshold value based at least in part on the workload associated with the second wind turbine component; and, operate the wind turbine component by said second wind turbine control device based on the second calculated operating threshold value.

8. A system in accordance with claim 1, wherein said wind turbine control device is configured to actuate a wind turbine component by actuating at least one of a yaw mechanism, a blade pitch mechanism, and a power converter.

9. A device for controlling an operation of a wind turbine, said device comprising:

a wind turbine control interface and configured to actuate a wind turbine component by a control device;

a memory configured to store one or more actuations of the wind turbine component by said wind turbine control interface;

a processor coupled to said memory and said wind turbine control interface, said processor programmed to:

determine a workload associated with the wind turbine component based at least in part on the actuations of the wind turbine component within a time period; and, calculate an operating threshold value based at least in part on the determined workload, wherein the calculated operating threshold value and the determined workload have a relationship at least partially defined by the operating threshold proportional to $(1-e^{-workload})/(1+e^{-workload})$; and, actuate the wind turbine component by said wind turbine control interface based at least in part on the calculated operating threshold value.

10. A device in accordance with claim 9, further comprising a sensor interface configured to receive an operating condition from a sensor, wherein said processor is configured to actuate the wind turbine component by said wind turbine control interface when the operating condition violates the calculated operating threshold value.

11. A device in accordance with claim 9, wherein said processor determines the workload based at least in part on a quantity of actuations of the wind turbine component within the time period.

12. A device in accordance with claim 9, wherein said processor is further programmed to:

calculate an aggregate level of actuation based on the actuations of the wind turbine component within the time period; and, determine the workload based at least in part on the aggregate level of actuation of the wind turbine component.

13. A device in accordance with claim 12, wherein said processor calculates the aggregate level of actuation by calculating an elapsed time of actuation.

14. A device in accordance with claim 12, wherein said processor calculates the aggregate level of actuation by calculating a total displacement of the wind turbine component.

15. A method for controlling an operation of a wind turbine, said method comprising:

operating a wind turbine component at a first time based on a first operating threshold value, wherein the first operating threshold value is based at least in part on one or more actuations of the wind turbine component within a first time period;

determining by the computing device a workload based at least in part on one or more actuations of the wind turbine component within a second time period subsequent to the first time period;

calculating by the computing device a second operating threshold value based at least in part on the workload, wherein the second calculated operating threshold value and the determined workload have a relationship at least partially defined by the operating threshold proportional to $(1-e^{-workload})/(1+e^{-workload})$; and, operating the wind turbine component at a second time subsequent to the first time based on the second operating threshold value.

16. A method in accordance with claim 15, wherein the wind turbine component is a first wind turbine component, said method further comprising:

calculating a third operating threshold value that is associated with a second wind turbine component, wherein the third calculated operating threshold value is greater than the first calculated operating threshold value and less than the second calculated operating threshold value; and, actuating the first wind turbine component when an operating condition is greater than the first operating threshold value at the first time; and, actuating the second wind turbine component when the operating condition is greater than the third operating threshold value at the second time.

17. A method in accordance with claim 15, wherein the second operating threshold value is based on a first workload that is associated with a first wind turbine component, said method further comprising:

determining by the computing device a second workload associated with a second wind turbine component; calculating by the computing device a third operating threshold value based at least in part on the second workload; and, operating the second wind turbine component based on the third operating threshold value.

18. A method in accordance with claim 15, wherein determining the workload comprises determining a workload that is positively correlated with a quantity of actuations of the wind turbine component within the second time period.

19. A method in accordance with claim 15, wherein determining the workload comprises determining a workload that is positively correlated with an aggregate level of actuation within the second time period.

20. A method in accordance with claim 15, further comprising determining a meteorological condition, wherein operating the wind turbine component based on the second operating threshold value comprises actuating the wind turbine component when the meteorological condition is greater than the second operating threshold value.

* * * * *